US010474290B2

(12) United States Patent
Oh et al.

(10) Patent No.: US 10,474,290 B2
(45) Date of Patent: Nov. 12, 2019

(54) ELECTRONIC DEVICE

(71) Applicant: LG Display Co., Ltd., Seoul (KR)

(72) Inventors: JunSeok Oh, Seoul (KR); JongHee Hwang, Goyang-si (KR); JongGu Heo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 122 days.

(21) Appl. No.: 15/240,843

(22) Filed: Aug. 18, 2016

(65) Prior Publication Data

US 2017/0177160 A1 Jun. 22, 2017

(30) Foreign Application Priority Data

Dec. 21, 2015 (KR) ........................ 10-2015-0182955

(51) Int. Cl.
*G06F 3/045* (2006.01)
*G06F 3/041* (2006.01)
*G06F 3/044* (2006.01)
*G06F 1/16* (2006.01)

(52) U.S. Cl.
CPC ............ *G06F 3/0418* (2013.01); *G06F 1/163* (2013.01); *G06F 1/1626* (2013.01); *G06F 1/1637* (2013.01); *G06F 3/044* (2013.01); *G06F 3/045* (2013.01); *G06F 3/0412* (2013.01); *G06F 3/0414* (2013.01); *G06F 2203/04105* (2013.01); *G06F 2203/04111* (2013.01); *G06F 2203/04113* (2013.01)

(58) Field of Classification Search
CPC .... G06F 3/0418; G06F 3/0412; G06F 3/0414; G06F 3/044; G06F 1/1626; G06F 1/163; G06F 1/1637; G06F 3/045; G06F 2203/04105; G06F 2203/04111; G06F 2203/04113; G06F 3/01; G06F 3/041; G04B 47/06
USPC ........................................................ 345/174
See application file for complete search history.

(56) References Cited

U.S. PATENT DOCUMENTS

| 6,052,339 | A | * | 4/2000 | Frenkel | .................. | G04B 25/02 |
| | | | | | | 368/230 |
| 6,754,137 | B1 | * | 6/2004 | Bourquin | ........... | G04C 17/0091 |
| | | | | | | 368/10 |
| 9,746,953 | B2 | * | 8/2017 | Kitada | .................. | G06F 3/0414 |
| 2008/0018608 | A1 | * | 1/2008 | Serban | .................. | G06F 3/0416 |
| | | | | | | 345/173 |
| 2008/0018609 | A1 | * | 1/2008 | Baker | ..................... | G06F 3/045 |
| | | | | | | 345/173 |
| 2009/0140996 | A1 | * | 6/2009 | Takashima | ............ | G06F 1/1626 |
| | | | | | | 345/173 |

(Continued)

FOREIGN PATENT DOCUMENTS

| EP | 2333645 | 6/2011 |
| JP | 2012190475 | 10/2012 |

(Continued)

*Primary Examiner* — Ibrahim A Khan
(74) *Attorney, Agent, or Firm* — Fenwick & West LLP

(57) ABSTRACT

An electronic device is capable of having a minimum sensing pressure with a low value through a resistive type force touch sensing method, wherein the electronic device may include a force sensing panel having a force sensor member whose shape is changed according to a touch pressure applied to a cover window so as to electrically connect first and second electrodes prepared on the same plane and provided in parallel.

30 Claims, 9 Drawing Sheets

(56) References Cited

U.S. PATENT DOCUMENTS

| | | | | |
|---|---|---|---|---|
| 2012/0313860 | A1* | 12/2012 | Hashimura | B82Y 15/00 345/173 |
| 2013/0278542 | A1* | 10/2013 | Stephanou | G06F 3/0414 345/174 |
| 2014/0218334 | A1* | 8/2014 | Shibata | G06F 3/044 345/174 |
| 2014/0253305 | A1* | 9/2014 | Rosenberg | G06F 3/016 340/407.2 |
| 2015/0049033 | A1 | 2/2015 | Kim et al. | |
| 2015/0185946 | A1* | 7/2015 | Fourie | G06F 3/0416 345/174 |
| 2015/0268783 | A1 | 9/2015 | Yoon et al. | |
| 2015/0331512 | A1* | 11/2015 | McMillen | G06F 1/163 345/173 |
| 2016/0139717 | A1* | 5/2016 | Filiz | G01L 1/18 345/173 |
| 2016/0253019 | A1* | 9/2016 | Geaghan | G06F 3/041 345/174 |
| 2017/0031504 | A1* | 2/2017 | Hwang | G06F 3/0488 |
| 2017/0052616 | A1* | 2/2017 | Lin | G06F 3/044 |
| 2017/0068217 | A1* | 3/2017 | Chen, Jr. | G04C 10/02 |
| 2017/0090637 | A1* | 3/2017 | Yoon | G06F 3/0414 |
| 2017/0277138 | A1* | 9/2017 | Kaji | G04G 21/025 |
| 2018/0299997 | A1* | 10/2018 | Isaacson | G06F 3/045 |

FOREIGN PATENT DOCUMENTS

| | | |
|---|---|---|
| JP | 2015185169 | 10/2015 |
| WO | WO 2007091600 | 8/2007 |
| WO | WO 2015/123322 | 8/2015 |

\* cited by examiner

ELECTRONIC DEVICE

CROSS REFERENCE TO RELATED APPLICATIONS

This application claims priority from Republic of Korea Patent Application No. 10-2015-0182955, filed on Dec. 21, 2015, which is incorporated by reference herein in its entirety.

BACKGROUND

Field of the Disclosure

The present disclosure relates to an electronic device, and more particularly, to an electronic device having a force touch function.

Discussion of the Related Art

A touch screen device is a type of input device that allows a user to input information through a screen of a display device without an additional input device. The touch screen device is generally used as the input device for various kinds of products such as television, notebook computer and monitor as well as portable electronic devices such as electronic notebook, electronic book (e-book), PMP (Portable Multimedia Player), navigation, UMPC (Ultra Mobile PC), mobile phone, smart phone, smart watch, tablet PC (tablet Personal Computer), watch phone, and mobile communication terminal.

Generally, the touch screen device may be largely classified into a resistive type which senses a touch position in accordance with a change of resistance value, and a capacitive type which senses a touch position in accordance with a change of capacitance. Recently, the capacitive type has attracted great attention due to advantages of being simpler to manufacture and having good sensitivity.

With a recent developments of applications that require touch information for a force touch, a capacitive type electronic device having a force touch function for sensing a touch force has been developed and studied.

A related art force sensing panel is provided on a cover window to sense a touch force in accordance with a user's force touch. The related art force sensing panel includes an elastic member, and first and second electrodes confronting each other with the elastic member interposed in-between. In case of the force sensing panel, a capacitance formed between the first and second electrodes is changed in accordance with a shape change of the elastic member by a user's force touch on the cover window. Accordingly, a touch driving circuit connected with the force sensing panel sense a user's touch force based on the change of capacitance formed between the first and second electrodes.

If the related art force sensing panel is applied to a small-sized electronic device such as a smart watch, the electronic device may include a housing having a receiving space, a cover window for covering an upper side of the housing, a display module attached to the cover window, and the force sensing panel disposed between the display module and the housing.

However, since the related art electronic device has a single electrode structure having a small area, a high amount of minimum pressure is needed before touch force can be sensed due to a relatively-small amount of deformation change that occurs when there is a touch force in a vertical direction.

SUMMARY

In one embodiment, there is provided an electronic device that substantially obviates one or more problems due to limitations and disadvantages of the related art.

There is provided an electronic device which is capable of having a minimum sensing pressure with a low value through a resistive type force touch sensing method.

Additional advantages and features of embodiments disclosed herein will be set forth in part in the description which follows and in part will become apparent to those having ordinary skill in the art upon examination of the following or may be learned from practice of embodiments disclosed herein. The objectives and other advantages of embodiments disclosed herein may be realized and attained by the structure particularly pointed out in the written description and claims hereof as well as the appended drawings.

In one embodiment, there is provided an electronic device that may include a force sensing panel having a force sensor member whose shape is changed according to a touch pressure applied to a cover window so as to electrically connect first and second electrodes prepared on the same plane and provided in parallel.

It is to be understood that both the foregoing general description and the following detailed description of embodiments are exemplary and explanatory and are intended to provide further explanation of the invention as claimed.

BRIEF DESCRIPTION OF THE DRAWINGS

The accompanying drawings, which are included to provide a further understanding of the present disclosure and are incorporated in and constitute a part of this application, illustrate embodiment(s) and together with the description serve to explain the principle of the present disclosure. In the drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements. The terms "prepared" and "provided" may be used to mean "disposed", "positioned", or "formed". For example, the terms "prepared on", "prepared in", or "provided on" may be used to mean "disposed on", "positioned on", "formed in", or "formed on"; the term "prepared between" may be used to mean "disposed between", "positioned between", or "formed between"; and the term "prepared along" may be used to mean "disposed along", "positioned along", or "formed along".

Hereinafter, an electronic device according to the embodiment will be described in detail with reference to the accompanying drawings. Wherever possible, the same reference numbers will be used throughout the drawings to refer to the same or like parts. Also, in the following description, if detailed description of elements or functions known in respect of the present disclosure is determined to make the subject matter of the present disclosure unnecessarily obscure, the detailed description will be omitted.

Figure 1:
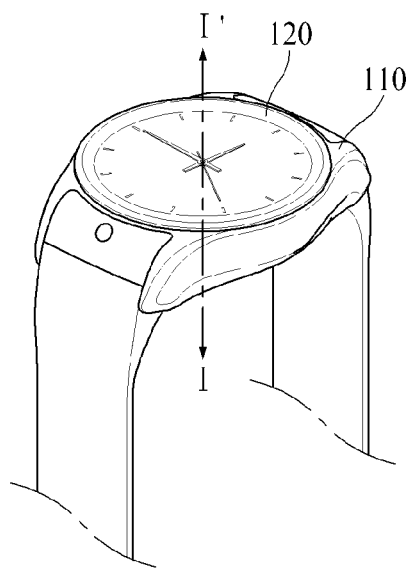
FIG. 1 illustrates an electronic device according to one embodiment.
Figure 2:
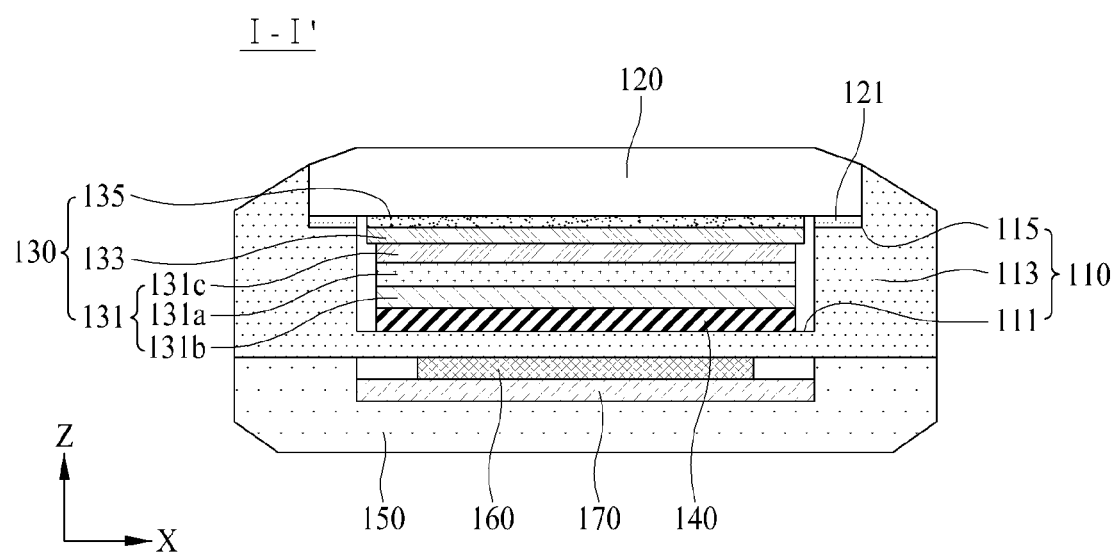
FIG. 2 is a cross sectional view along I-I' of FIG. 1.

FIG. 1 illustrates an electronic device according to one embodiment. FIG. 2 is a cross sectional view along I-I' of FIG. 1.

Referring to FIGS. 1 and 2, the electronic device according to one embodiment may include a housing 110, a cover window 120, a display module 130, and a force sensing panel 140.

The housing 110 receives the display module 130 and the force sensing panel 140 therein. To this end, the housing 110 includes a bottom base portion 111 and a sidewall 113 defining a receiving space whose upper surface is open. In one embodiment, the bottom of the housing 110 may be referred to as a base. The sidewall 113 of the housing 110 may include a stepped portion 115 for supporting the cover window 120, wherein the stepped portion 115 may be prepared along or prepared in an upper internal lateral side. The bottom base portion 111 of the housing 110 may have a quadrangle or circle shape.

The cover window 120 may have a quadrangle or circle shape corresponding to the shape of the bottom base portion 111 of the housing 110. The cover window 120 for covering the receiving space of the housing 110 is provided in the sidewall 113 of the housing 110. That is, the cover window 120 is supported by the stepped portion 115 prepared in the housing 110. The cover window 120 supports the display module 130 received in the housing 110, and protects the display module 130. The cover window 120 according to one example may be formed of a tempered glass, a transparent plastic, or a transparent film. According to an example, the cover window 120 may include at least any one of sapphire glass and gorilla glass. According to another example, the cover window 120 may include any one among PET (polyethyleneterephthalate), PC (polycarbonate), PES (polyethersulfone), PEN (polyethylenapthanate), and PNB (polynorborneen). In consideration of scratches and transparency, the cover window 120 may include the tempered glass, preferably.

The cover window 120 is movably supported by the housing 110. To this end, a rear edge of the cover window 120 may be supported by an impact-absorbing member 121 prepared in the stepped portion 115 of the housing 110. The impact-absorbing member 121 is prepared in the stepped portion 115 of the housing 110 so that the cover window 120 is moved in an up-and-down direction (Z) in accordance with a user's touch pressure. The impact-absorbing member 121 according to one example may include an impact-absorbing pad or a double-sided adhesive foam pad.

The display module 130, which is received in the receiving space of the housing 110, displays an image. Also, the display module 130 senses a touch position corresponding to a user's touch on the cover window 120. The display module 130 may have a quadrangle or circle shape corresponding to the shape of the bottom base portion 111 of the housing 110.

The display module 130 according to one example may include a display panel 131, a position sensing panel 133, and a polarizing film 135.

The display panel 131 is an organic light emitting display panel for displaying an image by an emission of an organic light emitting layer. The display panel 131 may include a base substrate 131a, a back plate 131b, and an encapsulation layer 131c.

The base substrate 131a may be formed of a flexible material. For example, the base substrate 131a may be PI (polyimide) film, but not limited to this material. The base substrate 131a may include a pixel array (not shown), and a pad portion (not shown).

The pixel array is prepared on the base substrate 131a, wherein the pixel array includes a plurality of pixels provided every pixel region defined by crossing a plurality of gate lines and a plurality of data lines. Each pixel may include a switching transistor connected with the gate and data lines, a driving transistor supplied with a data signal from the switching transistor, and an organic light emitting device for emitting light by a data current supplied from the driving transistor. The organic light emitting device may include an anode electrode connected with the driving transistor, an organic emitting layer prepared on the anode electrode, and a cathode electrode prepared on the organic emitting layer. Each pixel is defined by a bank pattern.

The pad portion is prepared at one side of the base substrate 131a, and is connected with each signal line prepared in the pixel array. The pad portion is connected with the driving circuit 135, wherein the pad portion transmits a signal, which is supplied from the driving circuit 135, to the pixel array.

The back plate 131b maintains the base substrate 131a in a plane state. The back plate 131b according to one example may include a transparent plastic material, for example, PET (polyethyleneterephthalate) material. The back plate 131b is attached to a rear surface of the base substrate 131a by a laminating process using an optical adhesive (not shown), to thereby maintain the plane state of the base substrate 131a.

The encapsulation layer 131c for covering the pixel array except the pad portion is prepared on the base substrate 131a. The encapsulation layer 131c protects the organic light emitting device from oxygen or moisture.

The position sensing panel 133 is provided on the encapsulation layer 131c. The position sensing panel 133 may have an add-on-type touch panel structure for sensing a user's touch position. For example, the position sensing panel 133 may have an electrode structure of mutual capacitance type or self capacitance type.

The polarizing film 135 is attached to an entire upper surface of the position sensing panel 133. The polarizing film 135 prevents a reflection by external light, to thereby improve visibility of the display panel 131. Selectively, the polarizing film 135 may be disposed between the cover window 120 and the position sensing panel 133, but not limited to this structure. For example, the polarizing film 135 may be disposed between the position sensing panel 133 and the display panel 131.

The display module 130 is connected with a rear surface of the cover window 120 by the use of transparent adhesive member (not shown), and is supported by the cover window 120. That is, the display module 130 is connected with the rear surface of the cover window 120 by the use of transparent adhesive member (not shown), whereby the display module 130 is hung on the rear surface of the cover window 120 while being spaced apart from the bottom base portion 111 of the housing 110. In this case, the transparent adhesive member may include OCA (optical clear adhesive) or OCR (optical clear resin).

The force sensing panel 140 includes a force sensor for sensing a touch force corresponding to a touch pressure applied to the cover window 120, wherein the force sensing panel 140 is supported by the housing 110. The force sensing panel 140 may have a quadrangle or circle shape corresponding to the shape of the bottom base portion 111 of the housing 110. For example, the force sensing panel 140 includes a resistive type force sensor whose resistance value is changed by variations in shape of the display module 130 in accordance with a touch pressure applied to the cover window 120. The force sensing panel 140 includes the resistive type force sensor instead of a capacitive type force sensor which is changed in accordance with a change of distance between the display module 130 and the housing 110, whereby the force sensing panel 140 has a minimum sensing pressure with a low minimum value.

Additionally, the electronic device according to one embodiment may further include a rear cover 150, a driving circuit 160, and a power source part 170.

The rear cover 150 is connected with a rear surface of the housing 110, to thereby cover the rear surface of the housing 110. The rear cover 150 includes a system receiving cavity (or 'hole', or 'hollow').

The driving circuit 160 is received in the system receiving cavity prepared in the rear cover 150, and the driving circuit 160 is connected with the display module 130, the position sensing panel 133 and the force sensing panel 140 through a signal transmission member (not shown). In this case, the signal transmission member may connect the display module 130, the position sensing panel 133 and the force sensing panel 140 with the driving circuit 160 through a through hole (not shown) prepared in the bottom base portion 111 of the housing 110.

The driving circuit 160 generates a pixel driving signal and a data signal for displaying an image, and supplies the generated pixel driving signal and data signal to each pixel of the display module 130, to thereby display an image on the display module 130. Also, the driving circuit 160 senses a touch position in accordance with a user's touch through the position sensing panel 133, and executes an application corresponding to the sensed touch position. The driving circuit 160 senses a touch force in accordance with a user's touch pressure through the force sensing panel 140, and executes an application corresponding to the sensed touch force or the touch force corresponding to the touch position.

The power source part 170 is received in the system receiving cavity prepared in the rear cover 150, wherein the power source part 170 provides a driving power required for a driving of the electronic device. For example, the power source part 170 may include a rechargeable battery.

Figure 3:
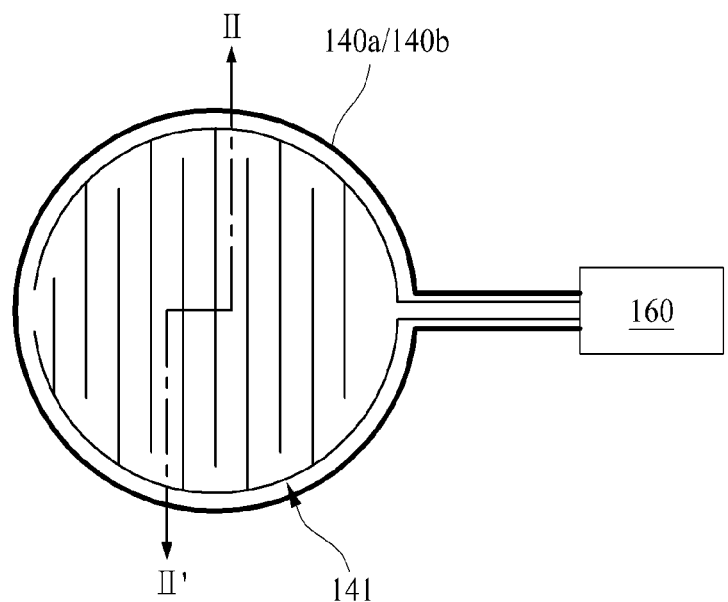
FIG. 3 is a plane view illustrating a force sensing panel according to one embodiment.
Figure 4:
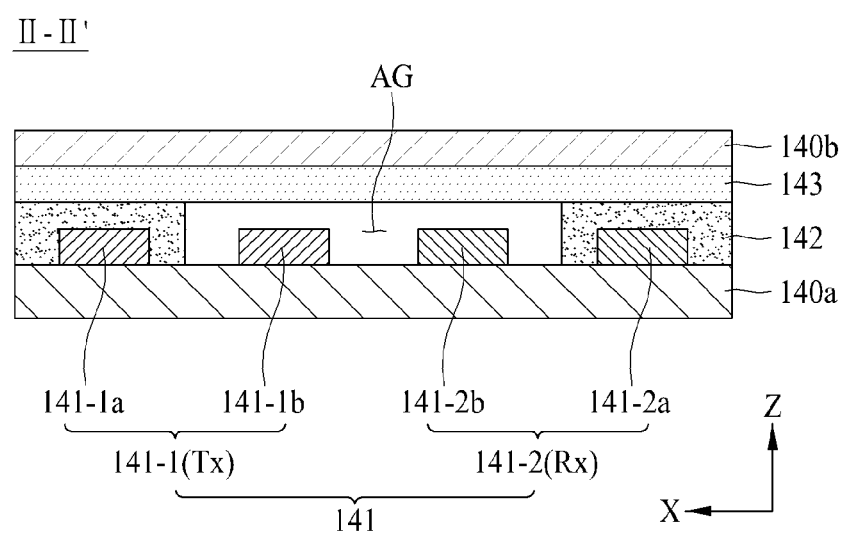
FIG. 4 is a cross sectional view along II-II' of FIG. 3.
Figure 5:
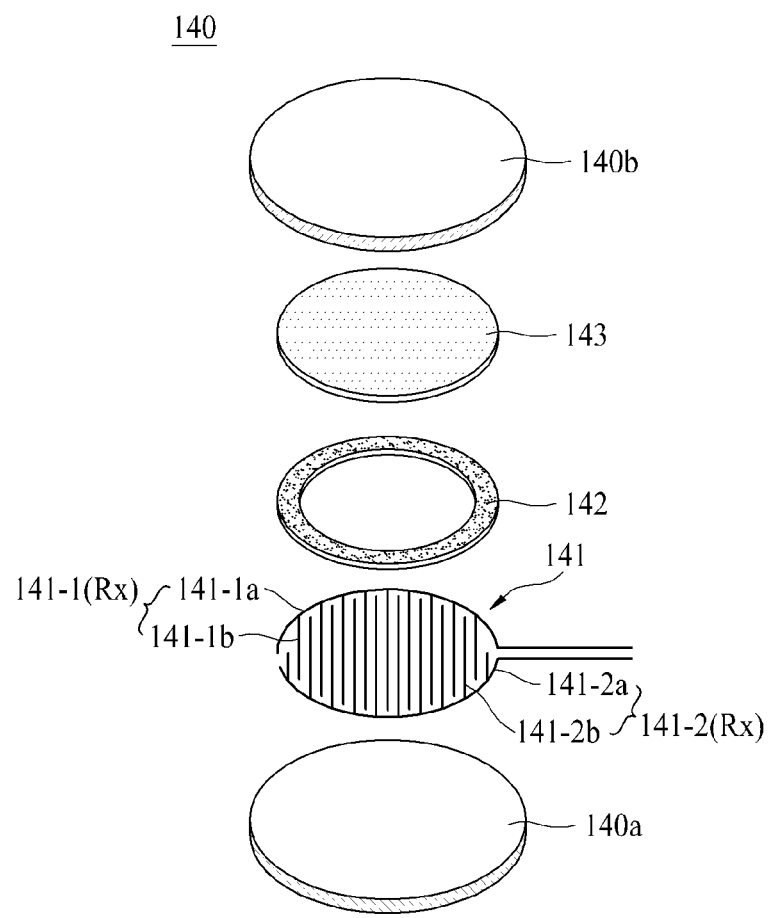
FIG. 5 is an exploded perspective view illustrating the force sensing panel shown in FIG. 3.

FIG. 3 is a plane view illustrating the force sensing panel according to one embodiment, FIG. 4 is a cross sectional view along II-II' of FIG. 3, and FIG. 5 is an exploded perspective view illustrating the force sensing panel shown in FIG. 3.

Referring to FIGS. 3 to 5, the force sensing panel 140 according to one embodiment may include an electrode part 141 and a force sensor member 143. The force sensing panel 140 according to one embodiment is connected with the display module 130, that is, a rear surface of the back plate 131b prepared in the display panel 130, whereby the force sensing panel 140 according to one embodiment easily senses the changed shape of the display module 130 in accordance with a user's touch pressure.

The electrode part 141 according to one example may include a first electrode 141-1 and a second electrode 141-2 which are prepared in parallel on the same plane. In this case, the first electrode 141-1 and the second electrode 141-2 are not directly connected with each other while being in parallel.

The force sensor member 143 according to one example is overlapped with the first electrode part 141, and is changed in shape in accordance with a touch pressure, to thereby electrically connect the first electrode 141-1 and the second electrode 141-2 with each other. That is, the force sensor member 143 creates a resistance between the first electrode 141-1 and the second electrode 141-2 in accordance with a user's force touch. The force sensor member 143, first electrode 141-1 and second electrode 141-2 together form a force sensor. A resistance value of the force sensor is changed based on a contact area between the force sensor member 143 and each of the first and second electrodes 141-1 and 141-2 in accordance with a touch pressure (or contact load), to thereby sense a user's force touch. The force sensor member 143 according to one example may be formed of a piezo-resistive based material or a pressure-sensitive adhesive material based on any one of QTC (quantum tunneling composites), EAP (electro-active polymer) and acrylic and rubber based solvent. In this case, a resistance of the pressure-sensitive adhesive material varies according to an area. In case of the piezo-resistive based material, if an external pressure is applied to silicon semi-conductor crystals, a conduction energy is generated and an electric charge is transferred to a conduction band, whereby it is possible to have a piezo-resistive effect by a change of resistivity.

The electrode part 141 according to one example is prepared in the first substrate 140a, the force sensor member 143 is prepared in the second substrate 140b, and the electrode part 141 and the force sensor member 143 are provided at a predetermined air gap (AG) from each other by a spacer 142.

The first substrate 140a according to one example supports the electrode part 141, and the first substrate 140a is formed of a transparent or opaque material. For example, the first substrate 140a may include PET (polyethyleneterephthalate) material. The first substrate 140a may have a quadrangle or circle shape corresponding to the shape of the bottom base portion 111 of the housing 110. Although the first substrate 140a may have a circular shape or a quadrangular shape, for ease of explanation, in the following description we will assume that the first substrate 140a has a circular shape.

The second substrate 140b according to one example is provided on the first substrate 140a, wherein the second substrate 140b supports the force sensor member 143. The second substrate 140b is formed of a transparent or opaque material. For example, the second substrate 140b may be formed of the same material as that of the first substrate 140a, and the second substrate 140b may have the same shape as that of the first substrate 140a. The second substrate 140b is connected with the display module 130, that is, a rear surface of the back plate 131b prepared in the display panel 131 by the use of transparent adhesive member.

The spacer 142 according to one example is prepared between the first substrate 140a and the second substrate 140b, whereby the force sensor member 143 and the electrode part 141 are spaced apart from each other by the spacer 142. The spacer 142 according to one example is disposed between a front edge of the first substrate 140a and a rear edge of the second substrate 140b, whereby the force sensor member 143 and the electrode part 141 may be spaced apart from each other. The spacer 142 according to another example may be disposed between a front edge of the first substrate 140a and a rear edge of the force sensor member 143, whereby the force sensor member 143 and the electrode part 141 may be spaced apart from each other. Accordingly, if a touch pressure is not applied, the force sensor member 143 and the electrode part 141 are spaced apart from each other with the air gap (AG) in-between by the spacer 142.

The force sensor member 143 according to one example is prepared in an entire rear surface of the second substrate 140b facing a front surface of the first substrate 140a, or the remaining portions of the second substrate 140b except a rear edge of the second substrate 140b, whereby the force sensor member 143 is disposed on the electrode part 141. The force sensor member 143 may have a quadrangle or circle shape corresponding to the shape of the bottom base portion 111 of the housing 110. Although the force sensor member 143 may have a circular shape or a quadrangular shape, for ease of explanation, in the following description we will assume that the force sensor member 143 has a circular shape.

The first electrode 141-1 and the second electrode 141-2 according to one example are disposed on the same plane of the first substrate 140a while being in parallel with each other, wherein each of the first electrode 141-1 and the second electrode 141-2 according to one example includes at least one of curved-line or straight-line shape. As one possibility, the first electrode 141-1 and the second electrode 141-2 each comprise at least one of a straight element or a curved element. In this case, a resistance of the force sensor varies in accordance with a contact area between the force sensor member 143 and the electrode part 141. Thus, each of the first electrode 141-1 and the second electrode 141-2 being in parallel may have a straight-line shape with a zigzag pattern or an uneven curved-surface shape so as to increase the contact area with the force sensor member 143.

The first electrode 141-1 according to one example may include a first line pattern 141-1a and a plurality of first branch patterns 141-1b.

The first line pattern 141-1a according to one example is prepared along one side of the first substrate 140a. That is, with respect to a central line of the first substrate 140a, the first line pattern 141-1a may have a semi-circle or open-loop shape prepared at one side of the central line.

The plurality of first branch patterns 141-1b according to one example project from the first line pattern 141-1a, wherein the plurality of first branch patterns 141-1b are provided in parallel so that it is possible to increase an electrode area of the first electrode 141-1, thereby improving sensitivity in a force sensing process. That is, the plurality of first branch patterns 141-1b are provided at fixed intervals, and the plurality of first branch patterns 141-1b project from the first line pattern 141-1a to the other side of the first substrate 140a. As the first substrate 140a has the circle shape, the plurality of first branch patterns 141-1b have different lengths from one another.

The second electrode 141-2 according to one example may include a second line pattern 141-2a and a plurality of second branch patterns 141-2b.

The second line pattern 141-2a according to one example is provided along the other side of the first substrate 140a. That is, with respect to the central line of the first substrate 140a, the second line pattern 141-2a may have a semi-circle or open-loop shape prepared at the other side of the central line. Also, with respect to the central line of the first substrate 140a, the second line pattern 141-2a may be symmetric to the first line pattern 141-1a within a range being not electrically connected with the first line pattern 141-1a.

The plurality of second branch patterns 141-2b according to one example project from the second line pattern 141-2a, wherein the plurality of second branch patterns 141-2b are provided in parallel so that it is possible to increase an electrode area of the second electrode 141-2, thereby improving sensitivity in a force sensing process. That is, the plurality of second branch patterns 141-2b are provided at fixed intervals, and the plurality of second branch patterns 141-2b project from the second line pattern 141-2a to one side of the first substrate 140a. As the first substrate 140a has the circle shape, the plurality of second branch patterns 141-2b have different lengths from one another.

Each of the plurality of second branch patterns 141-2b is prepared between each of the plurality of first branch patterns 141-1b, whereby the plurality of second branch patterns 141-2b and the plurality of first branch patterns 141-1b are provided on the same plane, and each of the plurality of second branch patterns 141-2b alternates with each of the plurality of first branch patterns 141-1b. Accordingly, the air gap (AG) is prepared between the first and second electrodes 141-1 and 141-2, and the air gap (AG) increases the space for change of shape in the force sensor member 143, thereby improving force sensing efficiency. Thus, the force sensor member 143 may have a large amount of deformation even for a small touch pressure due to the air gap (AG).

Any one of the first and second electrodes 141-1 and 141-2 is used as a force driving electrode (Tx) which is supplied with a force touch driving signal from the driving circuit 160, and the other is used as a force sensing electrode (Rx) for sensing a touch force in the driving circuit 160. Accordingly, the driving circuit 160 generates the force touch driving signal, supplies the generated force touch driving signal to the force driving electrode (Tx), senses a change of resistance value in the force sensor through the force sensing electrode (Rx), and generates touch force data based on the sensed change of resistance value. At this time, the force touch driving signal may include an A.C. (Alternating Current) driving waveform, a D.C. (Direct Current) driving voltage or a ground voltage. In consideration of a circuit structure or a power consumption, the force touch driving signal may be selected from an A.C. driving waveform, a D.C. driving voltage and a ground voltage. In this case, the A.C. driving waveform may include a pulse wave, a sine wave, an attenuated sine wave, a square wave, a rectangle wave, a sawtooth wave, a triangular wave, or a step wave.

Figure 6:
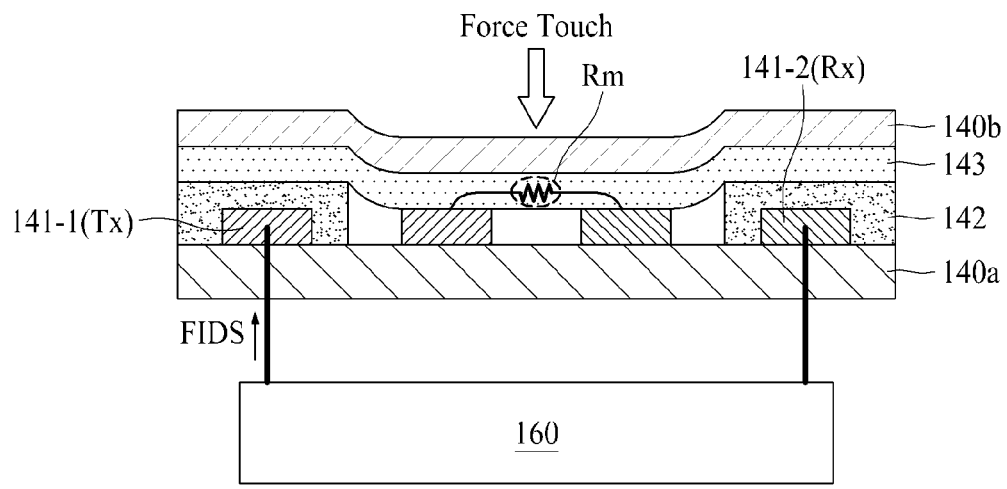
FIG. 6 illustrates a touch force sensing method using the force sensing panel shown in FIG. 4.

In detail, as shown in FIG. 6, the driving circuit 160 according to one example generates the force touch driving signal (FTDS), and supplies the generated force touch driving signal (FTDS) to the force driving electrode (Tx). In this case, if the force sensor member 143 is in a physical contact with the force driving electrode (Tx) and the force sensing electrode (Rx) in accordance with a user's force touch, a current path from the force driving electrode (Tx) through the force sensor member 143 and the force sensing electrode (Rx) is formed so that a force resistance (Rm) is formed in the force sensor member 143, whereby a current according to the force touch driving signal (FTDS) is supplied to the force driving electrode (Tx) through the resistance (Rm) flows to the force sensing electrode (Rx). Accordingly, the driving circuit 160 senses a voltage corresponding to the current flowing to the force sensing electrode (Rx) through the resistance (Rm) formed in the force sensor member 143 by the use of sensing part (not shown), calculates a touch force level through a force level algorithm that models a resistance variation of the resistance (Rm) formed in the force sensor member 143 on the basis of the sensed voltage, and executes an application linked to the calculated touch force level, for example, an unlocking application or an shortcut application.

Selectively, FIGS. 3 to 6 show that the electrode part 141 is prepared in the first substrate 140*a*, and the force sensor member 143 is prepared in the second substrate 140*b*, but not limited to this structure. For example, the electrode part 141 may be prepared in the second substrate 140*b*, and the force sensor member 143 may be prepared in the first substrate 140*a*. In this case, the electrode part 141 may be deformed and damaged by the change of shape in the second substrate 140*b* in accordance with a touch pressure.

In the electronic device according to one embodiment, the force touch is sensed by the variation of resistance in accordance with the contact area between the force sensor member 143 and the first and second electrodes 141-1 and 141-2 (located on the same plane) through the change of shape in the display module 130 according to a user's touch pressure so that it is possible to detect force touch with only a minimum amount of sensing pressure through resistive type force touch sensing, and thus to improve sensitivity of force touch detection.

Figure 7:
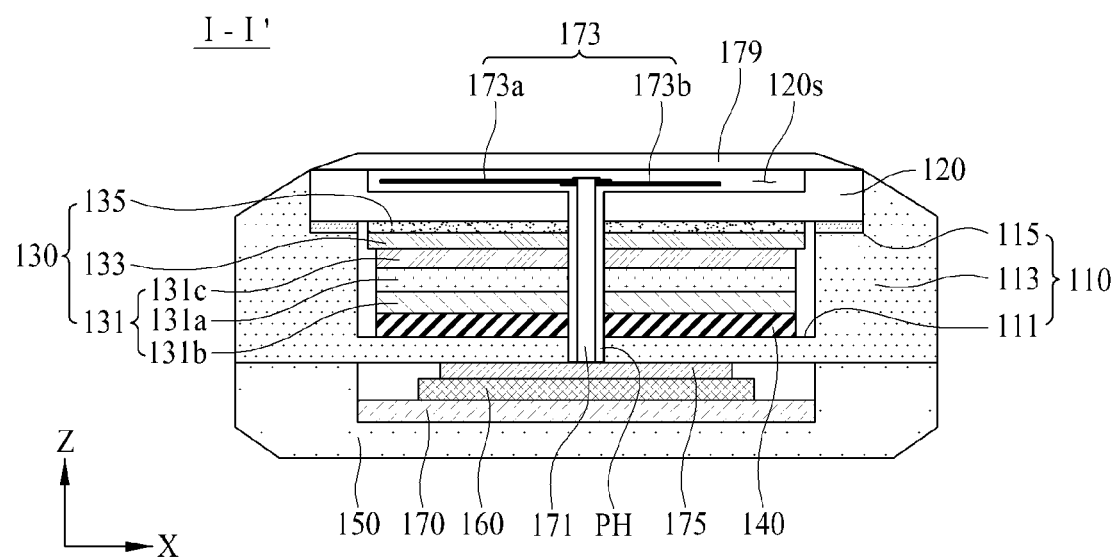
FIG. 7 is another cross sectional view along I-I' of FIG. 1.

Additionally, the electronic device according to one embodiment may further include a rotation axle 171, a wing 173 (or 'hand'), an axle driver 175, and a front transparent cover 179, as shown in FIG. 7.

The rotation axle 171, the wing 173, and the axle driver 174 constitute a clock device provided in the electronic device.

The rotation axle 171 according to one example vertically penetrates through the bottom base portion 111 of the housing 110, the force sensing panel 140, the display module 130, and the cover window 120. In this case, each of the bottom base portion 111 of the housing 110, the force sensing panel 140, the display module 130, and the cover window 120 includes a penetration hole (PH) prepared in its center. As one possibility, the rotation axle 171 is perpendicular to one or more of the bottom base portion 111 of the housing 110, the force sensing panel 140, the display module 130, the cover window 120, and the plane containing the first and second electrodes 141-1, 141-2.

The rotation axle 171 according to one example is rotatably inserted into the penetration hole (PH), and is provided in parallel to a vertical axis direction (Z). One end of the rotation axle 171 is disposed in the system receiving space of the rear cover 150, and the other end of the rotation axle 171 is disposed on the cover window 120. To this end, the cover window 120 further includes a front cavity (or 'hole', or 'hollow') 120*s* such that the cover window 120 has concave shape, and the other end of the rotation axle 171 is disposed in the front cavity. The front cavity 120*s* may have a size corresponding to the size of the display module 130.

The wing 173 according to one example is rotated on the cover window 120 in accordance with a rotation of the rotation axle 171. That is, the wing 173 is disposed in the front cavity 120*s* prepared in the cover window 120, whereby the wing 173 is rotatably connected with the other end of the rotation axle 171, and is rotated in accordance with the rotation of the rotation axle 171. For example, the wing 173 may include an hour hand of clock, a minute hand of clock, and a second hand of clock.

The axle driver 175 is disposed in the system receiving space of the rear cover 150. The axle driver 175 rotates the rotation axle 171. For example, the axle driver 175 may include a gear driver for rotating the wing in accordance with the passage of time, and a spring or rotation motor for driving the gear driver.

The front transparent cover 179 according to one example is connected with a front surface of the cover window 120, to thereby cover the wing 173. For example, the front transparent cover 179 may be formed of the same material as that of the cover window 120.

The electronic device according to one embodiment displays an image on the display module 130, and at the same time provides time analog information to a user through the use of clock device.

Figure 8:
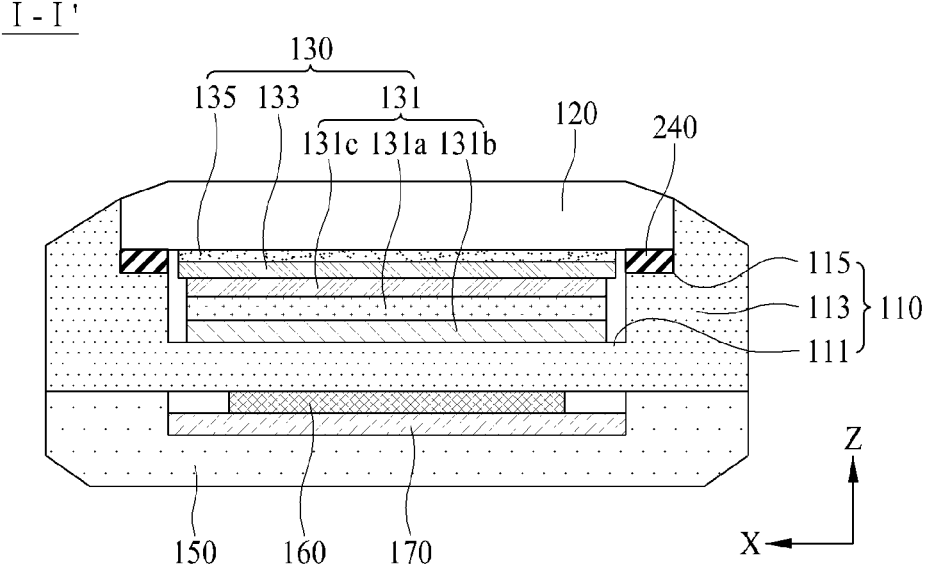
FIG. 8 illustrates a clock device according to one embodiment.
Figure 9:
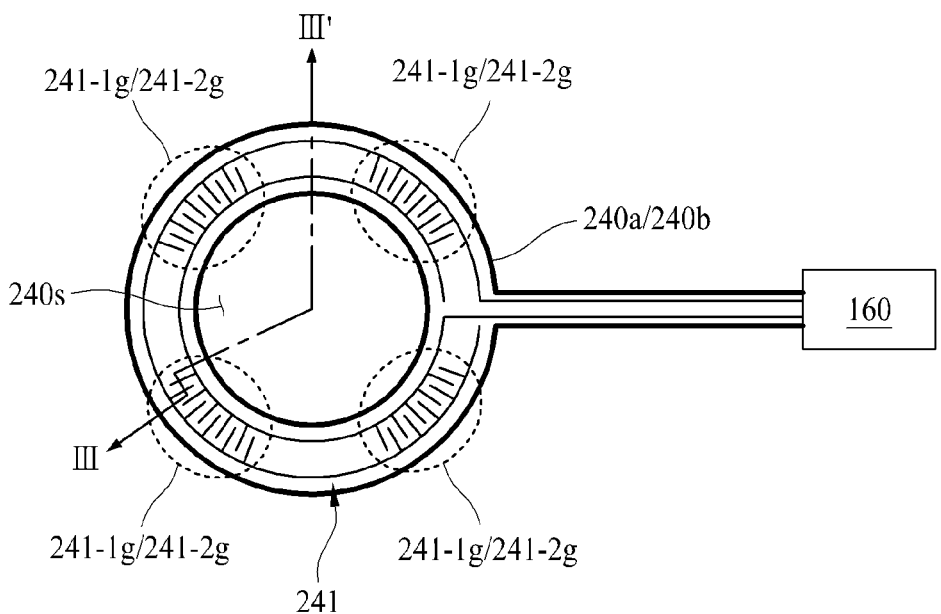
FIG. 9 is a plane view illustrating a force sensing panel shown in FIG. 8.
Figure 10:
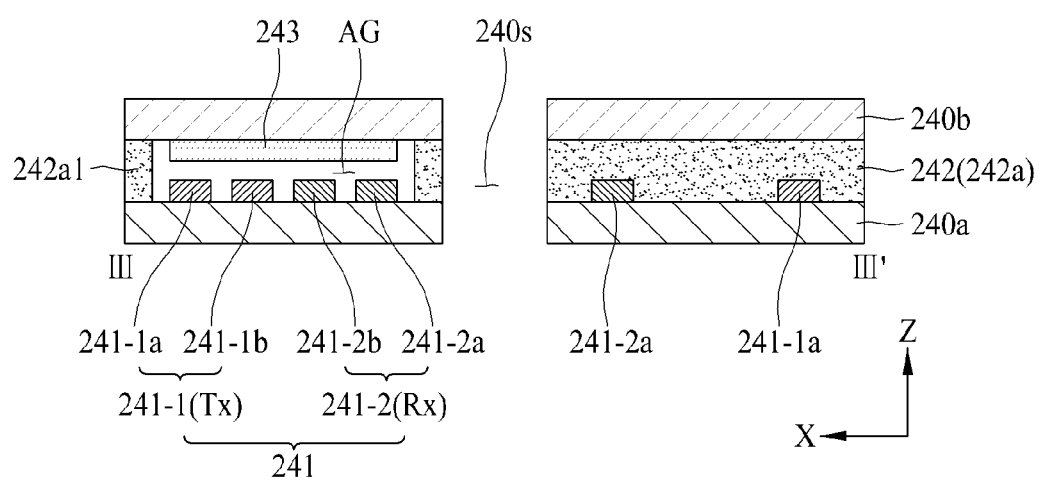
FIG. 10 is a cross sectional view along II-II' of FIG. 9.
Figure 11:
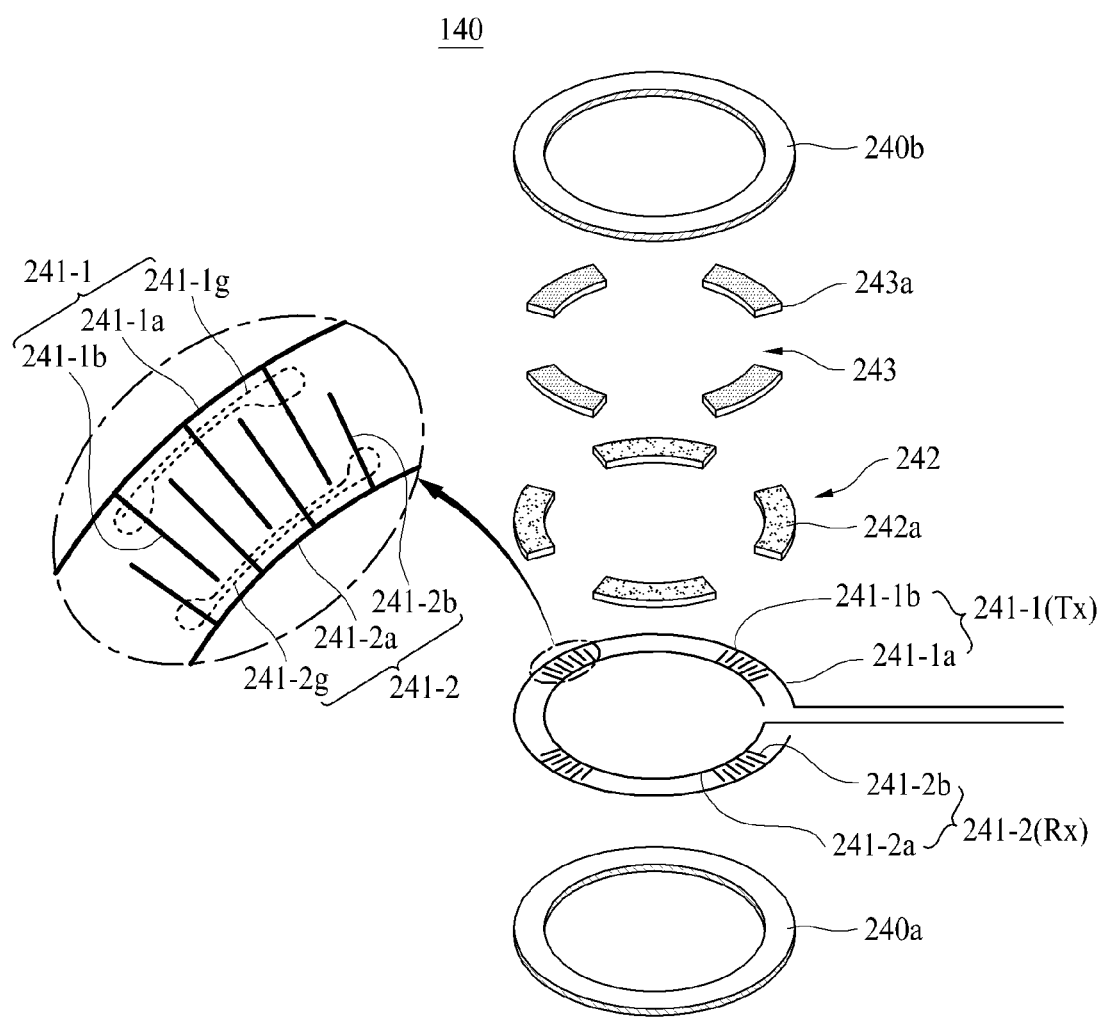
FIG. 11 is an exploded perspective view illustrating the force sensing panel shown in FIG. 9.

FIG. 8 is another cross sectional view along I-I' of FIG. 1. FIG. 9 is a plane view illustrating a force sensing panel shown in FIG. 8. FIG. 10 is a cross sectional view along III-III' of FIG. 9. FIG. 11 is an exploded perspective view illustrating the force sensing panel shown in FIG. 9. FIGS. 8 to 11 show an electronic device which is obtained by changing a structure of the force sensing panel shown in FIGS. 2 to 6. Accordingly, only the force sensing panel will be described in detail, and a detailed description for the same parts will be omitted.

Referring to FIGS. 8 to 11, the force sensing panel 240 is disposed in the periphery of a display module 130. That is, the force sensing panel 240 which surrounds the display module 130 is disposed between an edge of a cover window 120 and a sidewall 113 of a housing 110, whereby the force sensing panel 240 serves as a force sensor through a variation of resistance in accordance with a user's touch pressure on the cover window 120. In more detail, the force sensing panel 240 has a ring shape with a central hole 240*s*, and the force sensing panel 240 is provided between the edge of the cover window 120 and a stepped portion 115 prepared in the sidewall 113 of the housing 110.

The force sensing panel 240 according to one example may include an electrode part 241 and a force sensor member 243.

The electrode part 241 according to one example may include a first electrode 241-1 and a second electrode 241-2 which are prepared in parallel on the same plane. In this case, the first electrode 241-1 and the second electrode 241-2 are not directly connected with each other while being in parallel to each other.

The electrode part 241 is prepared in a first substrate 240a, the force sensor member 243 is prepared in a second substrate 240b, and the electrode part 241 and the force sensor member 243 are spaced apart from each other with an air gap (AG) in-between by a spacer 242.

The first substrate 240a supports the electrode part 241. The first substrate 240a may be formed of a transparent or opaque material. For example, the first substrate 240a may include PET (polyethyleneterephthalate) material. The first substrate 240a may have a circular or quadrangle ring shape overlapped with an edge of the cover window 120 or overlapped with the stepped portion 115 prepared in the sidewall 113 of the housing 110. Hereinafter, supposing that the first substrate 240a has the circular ring shape.

The second substrate 240b is disposed on the first substrate 240a. The second substrate 240b supports the force sensor member 243. The second substrate 240b may be formed of a transparent or opaque material. For example, the second substrate 240b may be formed of the same material as that of the first substrate 240a. The second substrate 240b may have the same ring shape as that of the first substrate 240a.

The first electrode 241-1 and the second electrode 241-2 according to one example are provided on the same plane of the first substrate 240a while being in parallel, wherein each of the first electrode 241-1 and the second electrode 241-2 according to one example includes at least one of curved-line or straight-line shape. As one possibility, the first electrode 241-1 and the second electrode 241-2 each comprise at least one of a straight element or a curved element. In this case, a resistance of the force sensor varies in accordance with a contact area between the force sensor member 243 and the electrode part 241. Thus, each of the first electrode 241-1 and the second electrode 241-2 being in parallel may have a straight-line shape with a zigzag pattern or an uneven curved-line shape.

The first electrode 241-1 according to one example may include a first line pattern 241-1a, and (N) first electrode pattern groups 241-1g (herein, 'N' is an integer of 2 or more).

The first line pattern 241-1a according to one example is provided to connect the (N) first electrode pattern groups 241-1g, wherein the first line pattern 241-1a is prepared along one side of the first substrate 240a. In this case, one side of the first substrate 240a may be an outer side of the first substrate 240a. The first line pattern 241-1a may have a partially-disconnected circular or open-loop shape.

The (N) first electrode pattern groups 241-1g may be prepared in the first substrate 240a while being symmetric with respect to a central line of the first substrate 240a, and may be connected with the first line pattern 241-1a. For example, if 'N' is 2, the two of first electrode pattern groups 241-1g are spaced apart from each other, and are symmetric to each other vertically, horizontally or diagonally with respect to the central line of the first substrate 240a. According to another example, if 'N' is 4, the four of first electrode pattern groups 241-1g are spaced apart from each other, and are symmetric vertically or horizontally with respect to the central line of the first substrate 240a. As the (N) first electrode pattern groups 241-1g are provided at fixed intervals, the respective first electrode pattern groups 241-1g have different resistance variations in accordance with a touch pressure for a corresponding position, which results in a force sensing level that is more clearly classified, thereby improving a sensing efficiency.

The (N) first electrode pattern groups 241-1g according to one example may include a plurality of first branch patterns 241-1b.

As the plurality of first branch patterns 241-1b, which are spaced apart from each other, project from the first line pattern 241-1a, the first electrode 241-1 is increased in its electrode area, to thereby improve sensitivity to a force sensing process. That is, each of the plurality of first branch patterns 241-1b projects from the first line pattern 241-1a to the second electrode 241-2 or the other side of the first substrate 240a. The branch patterns 241-1b may project in an inward radial direction. As the first substrate 240a has the circular ring shape, the plurality of first branch patterns 241-1b may have different lengths from one another while staying within a range that causes them to not be electrically connected with the second electrode 241-2.

The second electrode 241-2 according to one example may include a second line pattern 241-2a, and (N) second electrode pattern groups 241-2g.

The second line pattern 241-2a according to one example is provided to connect the (N) second electrode pattern groups 241-2g, wherein the second line pattern 241-2a is prepared along the other side of the first substrate 240a, and is spaced apart from and parallel with the first line pattern 241-1a. In this case, the other side of the first substrate 240a may be an inner side of the first substrate 240a. The second line pattern 241-2a may have a partially-disconnected circular or open-loop shape.

The (N) second electrode pattern groups 241-2g may be prepared in the first substrate 240a while being symmetric with respect to a central line of the first substrate 240a, and may be connected with the second line pattern 241-2a. Herein, each of the (N) second electrode pattern groups 241-2g is provided at the same position as each of the (N) first electrode pattern groups 241-1g, and each of the (N) second electrode pattern groups 241-2g is electrically separated from each of the (N) first electrode pattern groups 241-1g. As the (N) second electrode pattern groups 241-2g are provided at fixed intervals, the respective second electrode pattern groups 241-2g have different resistance variations in accordance with a touch pressure for a corresponding position, which results in a force sensing level that is more clearly classified, thereby improving a sensing efficiency.

The (N) second electrode pattern groups 241-2g according to one example may include a plurality of second branch patterns 241-2b.

As the plurality of second branch patterns 241-2b, which are spaced apart from each other, project from the second line pattern 241-2a, the second electrode 241-2 is increased in its electrode area, to thereby improve sensitivity to a force sensing process. That is, each of the plurality of second branch patterns 241-2b projects from the second line pattern 241-2a towards the first electrode 241-1 or one side of the first substrate 240a. The branch patterns 241-2b may project in an outward radial direction. As the first substrate 240a has the circular ring shape, the plurality of second branch patterns 241-2b may have different lengths from one another, while staying within a range that causes them to not be electrically connected with the first electrode 241-1, that is, the plurality of first branch patterns 241-1b.

Each of the plurality of second branch patterns 241-2b is located between each of the plurality of first branch patterns 241-1b, whereby the plurality of second branch patterns 241-2b and the plurality of first branch patterns 241-1b are provided on the same plane, and each of the plurality of second branch patterns 241-2b alternates with each of the plurality of first branch patterns 241-1b. Accordingly, the air gap (AG) is located between the first and second electrodes 241-1 and 241-2, and the air gap (AG) increases the space for variation of the force sensor member 243, thereby improving force sensing efficiency. Thus, the force sensor member 143 may have a large deformation for a small touch pressure due to the air gap (AG).

The spacer 242 is prepared between the first substrate 240a and the second substrate 240b, whereby the force sensor member 243 is spaced apart from the electrode part 241 by the spacer 242.

The spacer 242 according to one example may include (N) adhesive patterns 242a prepared between each of the (N) first electrode pattern groups 240-1g.

By each of the (N) adhesive patterns 242a, the first and second substrates 240a and 240b that face each other are bonded to each other. In order to form the air gap (AG) between the electrode part 241 and the force sensor member 243 without interrupting the electrical contact between the force sensor member 243 and the electrode part 241, each of the (N) adhesive patterns 242a is prepared between each of the (N) first electrode pattern groups 240-1g. To this end, each of the (N) adhesive patterns 242a has a thickness which is larger than a thickness (or height) of the electrode part 241. Additionally, the spacer 242 according to one example may further include a line adhesive pattern 242a1 prepared along both sides of the first substrate 240a and connected between each of the (N) adhesive patterns 242a so as to seal a space between the first and second substrates 240a and 240b.

Figure 12:
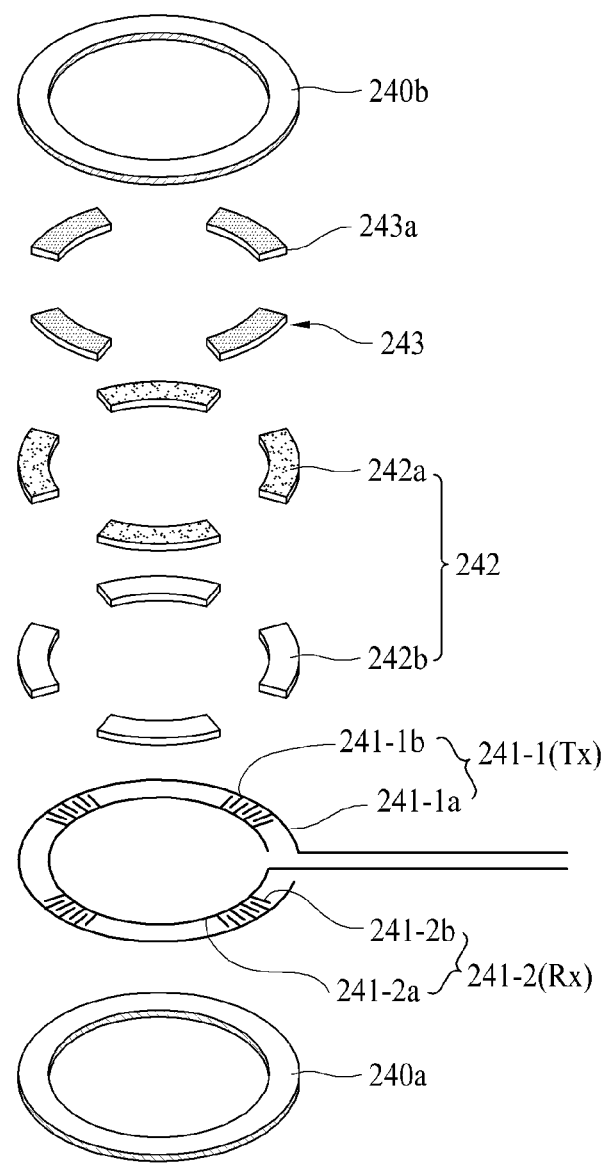
FIG. 12 illustrates an insulator pattern according to one embodiment.

As shown in FIG. 12, the spacer 242 according to one example may further include (N) insulator patterns 242b, wherein each of the (N) insulator patterns 242b may be provided between each of the (N) first electrode pattern groups 240-1g.

Each of the (N) insulator patterns 242b according to one example is prepared between the first substrate 240a and the second substrate 240b. By including each of the (N) insulator patterns 242b, each of the (N) first electrode pattern groups 240-1g is electrically insulated from each of the (N) second electrode pattern groups 240-2g so that it is possible to prevent an inflow of noise to the electrode, to thereby minimize lowering of sensing efficiency. A thickness in each of the (N) insulator patterns 242b may be the same as or more than the thickness (or height) of the electrode part 241. In this case, the electrode part 241 and the force sensor member 243 are spaced apart from each other by each of the (N) insulator patterns 242b.

Referring once again to FIGS. 8 to 11, the force sensor member 243 is overlapped with the first electrode part 241, and is changed in shape according to a touch pressure, whereby the first electrode 241-1 and the second electrode 241-2 are electrically connected with each other. The force sensor member 243 according to one example is prepared in a pattern overlapped with each of the (N) first and second electrode pattern groups 241-1g and 241-2g. That is, the force sensor member 243 according to one example is patterned between each of the (N) adhesive patterns 242a. As described above, the shape of force sensor member 243 is changed in the air gap (AG) by a touch pressure in accordance with a user's force touch, whereby the force sensor member 243 is brought into contact with the first electrode 241-1 and the second electrode 241-2 to create a resistance between the first electrode 241-1 and the second electrode 241-2. The force sensor member 243, first electrode 241-1 and second electrode 241-2 form the touch sensor.

Any one of the first and second electrodes 241-1 and 241-2 is used as a force driving electrode (Tx) which is supplied with a force touch driving signal from the driving circuit 160, and the other is used as a force sensing electrode (Rx) for sensing a touch force in the driving circuit 160. Accordingly, the driving circuit 160 generates the force touch driving signal, supplies the generated force touch driving signal to the force driving electrode (Tx), senses a change of resistance value in the force sensor through the force sensing electrode (Rx), and generates touch force data based on the sensed change of resistance value.

Figure 13:
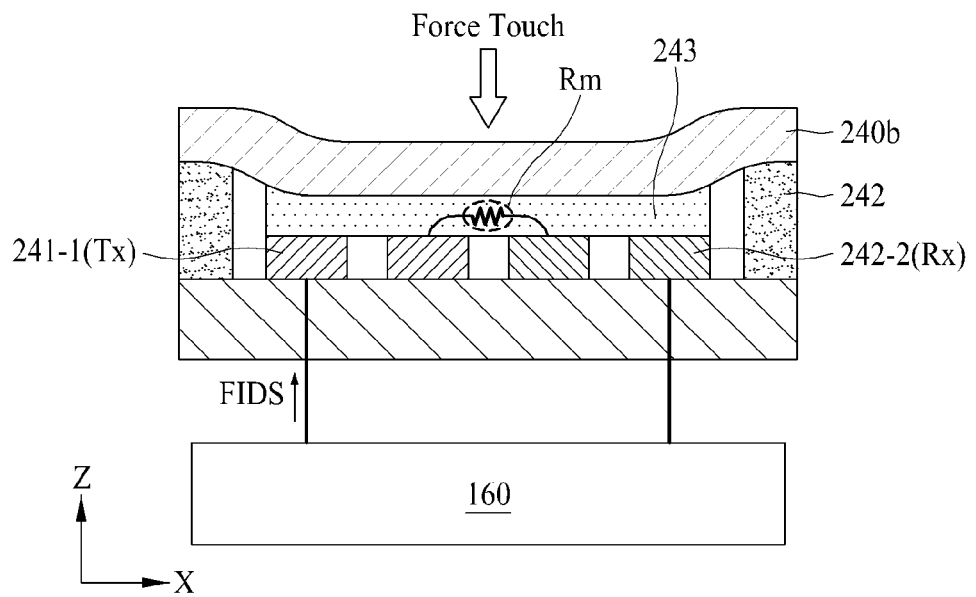
FIG. 13 illustrates a touch force sensing method using the force sensing panel shown in FIG. 10.

In more detail, as shown in FIG. 13, the driving circuit 160 generates the force touch driving signal (FTDS), and supplies the generated force touch driving signal (FTDS) to the force driving electrode (Tx). In this case, if the force sensor member 243 is in a physical contact with the force driving electrode (Tx) and the force sensing electrode (Rx) in accordance with a user's force touch, a current path from the force driving electrode (Tx) through the force sensor member 243 and the force sensing electrode (Rx) is formed so that a force resistance (Rm) is formed in the force sensor member 243, whereby a current according to the force touch driving signal (FTDS) supplied to the force driving electrode (Tx) through the resistance (Rm) flows to the force sensing electrode (Rx). Accordingly, the driving circuit 160 senses a voltage corresponding to the current flowing to the force sensing electrode (Rx) through the resistance (Rm) formed in the force sensor member 243 by the use of sensing part (not shown), calculates a touch force level through a force level algorithm of modeling a resistance variation of the resistance (Rm) formed in the force sensor member 243 on the basis of the sensed voltage, and executes an application linked to the calculated touch force level, for example, unlocking application or shortcut application.

Additionally, in one embodiment there may be a plurality of second line patterns 241-1a and each second line pattern 241-1a is connected to a difference second electrode pattern group 241-2g. In this case, each of the (N) second electrode pattern groups 241-2g used as the force sensing electrode (Rx) may be connected with the driving circuit 160 through each of the plurality of second line patterns 241-1a. In this case, the driving circuit 160 senses a touch force individually through each of the (N) second electrode pattern groups 241-2g so that it is possible to sense a multi-force touch, to calculate a force touch position and a touch force by each position, and also to execute various applications corresponding to the calculated force touch position and touch force by each position.

In the electronic device shown in FIGS. 9 to 13, the force touch is sensed by the variation of resistance in accordance with the contact area between the force sensor member 243 and the first and second electrodes 241-1 and 241-2 prepared on the same plane through the change of shape in the cover window 120 according to a user's touch pressure so that it is possible to realize a minimum sensing pressure with a low minimum value through resistive type force touch sensing, and thus to improve sensitivity of touch force sensing. As a user's touch force is sensed by the touch pressure in the cover window 120 through the ring-shaped force sensing panel 240, it is possible to realize increased touch force sensitivity.

Figure 14:
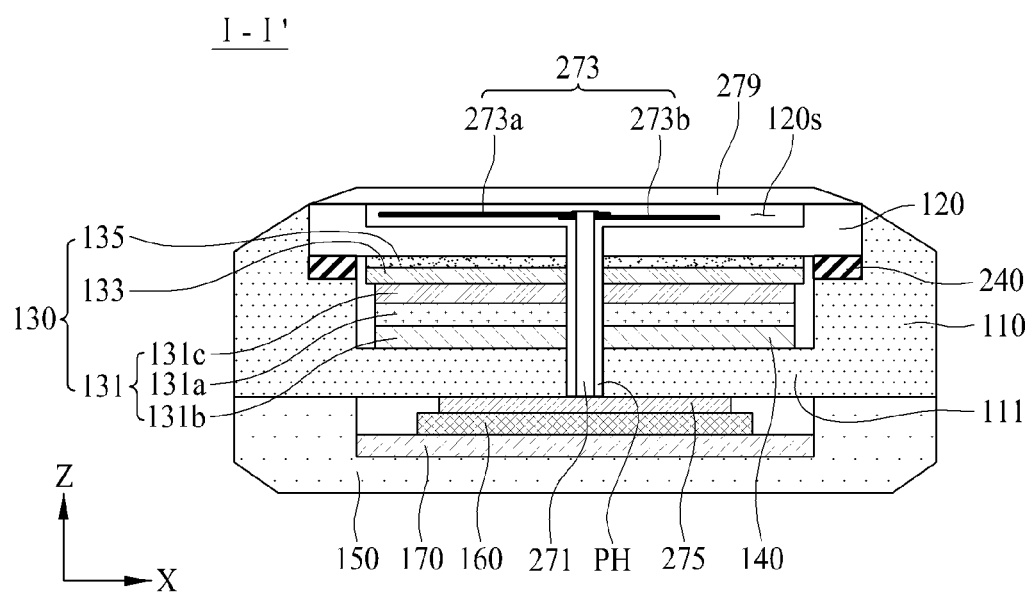
FIG. 14 illustrates a clock device according to one embodiment.

Additionally, the electronic device shown in FIGS. 9 to 13 may further include a rotation axle 271, a wing (or 'hand') 273, an axle driver 275, and a front transparent cover 279, as shown in FIG. 14. The rotation axle 271, the wing 273, and the axle driver 274 constitute a clock device provided in the electronic device.

The rotation axle 271 according to one example vertically penetrates through the bottom base portion 111 of the housing 110, the display module 130, and the cover window 120. In this case, each of the bottom base portion 111 of the housing 110, the display module 130, and the cover window 120 includes a penetration hole (PH) prepared in its center. As one possibility, the rotation axle 271 is perpendicular to one or more of the bottom base portion 111 of the housing 110, the display module 130, the cover window 120, and the plane containing the first and second electrodes 241-1, 241-2.

The rotation axle 271 according to one example is rotatably inserted into the penetration hole (PH), and is provided in parallel to a vertical axis direction (Z). One end of the rotation axle 271 is disposed in the system receiving space of the rear cover 150, and the other end of the rotation axle 271 is disposed on the cover window 120. To this end, the cover window 120 further includes a front cavity (or 'hole, or 'hollow') 120s such that the cover window 120 has concave shape, and the other end of the rotation axle 271 is disposed in the cavity 120s on the cover window 120. The front cavity 120s may have a size corresponding to the size of the display module 130.

The wing 273 according to one example is rotated on the cover window 120 in accordance with a rotation of the rotation axle 271. That is, the wing 273 is disposed in the front cavity 120s prepared in the cover window 120, whereby the wing 273 is rotatably connected with the other end of the rotation axle 271, and is rotated in accordance with the rotation of the rotation axle 271. For example, the wing 273 may include an hour hand of clock, a minute hand of clock, and a second hand of clock.

The axle driver 275 is disposed in the system receiving space of the rear cover 150. The axle driver 275 rotates the rotation axle 271. For example, the axle driver 275 may include a gear driver for rotating the wing in accordance with the passage of time, and a spring or rotation motor for driving the gear driver.

The front transparent cover 279 according to one example is connected with a front surface of the cover window 120, to thereby cover the wing 273. For example, the front transparent cover 279 may be formed of the same material as that of the cover window 120.

The electronic device shown in FIGS. 9 to 14 displays an image on the display module 130, and at the same time provides time analog information to a user through the use of clock device.

Additionally, FIG. 1 exemplarily shows the electronic device as being a smart watch or watch phone, but other embodiments are not necessarily limited to a smart watch or watch phone. The electronic device according to the present disclosure may be other mobile devices such as electronic notebooks, electronic books, PMPs (portable multimedia player), navigation devices, UMPC (ultra mobile PC), mobile phones, tablet PCs (personal computer), wearable devices and mobile communication terminals; home appliances with displays such as televisions, notebooks, monitors, cameras and camcorders; or dashboards on automobiles. Also, the electronic device according to the present disclosure may be applied to all electronic devices having the touch force panel and the display module for displaying images by the use of an organic light emitting display module or a liquid crystal display module.

According to at least one embodiment of the present disclosure, a touch force is sensed in accordance with a user's touch pressure by the use of a resistive type force sensor instead of a capacitive type force sensor so that it is possible to lower the minimum sensing pressure, thereby improving sensitivity to a force touch.

Also, it is possible to display an image on the display module, and to provide time analog information to a user by the use of a clock device.

It will be apparent to those skilled in the art that various modifications and variations can be made to embodiments disclosed herein without departing from the scope of the present disclosure. Thus, it is intended that the present disclosure covers modifications and variations provided they come within the scope of the appended claims and their equivalents.

The invention claimed is:
1. An electronic device comprising:
a housing having a receiving space;
a display module in the receiving space of the housing;
a cover window covering the receiving space; and
a force sensing panel, which is supported by the housing, for sensing a touch force corresponding to a touch pressure applied to the cover window,
wherein the force sensing panel includes:
an electrode part having first and second electrodes disposed in a same plane and being parallel to each other; and
a force sensor member arranged to change shape in response to the touch pressure, and which overlaps the electrode part to electrically connect the first electrode to the second electrode when the touch pressure is applied to the cover window,
wherein the force sensor member is not in contact with the first electrode and the second electrode while no touch pressure is applied to the cover window, and the force sensor member is in contact with the first electrode and the second electrode in response to the touch pressure to the cover window, the force sensor member creating a resistance between the first electrode and the second electrode when the force sensor member is in contact with the first electrode and the second electrode, wherein the resistance is based on a contact area between the force sensor member and the first electrode and the second electrode.

2. The electronic device according to claim 1, wherein the force sensing panel includes:
a first substrate upon which the electrode part is disposed;
a second substrate upon which the force sensor member is disposed, wherein the second substrate is disposed on the first substrate; and
a spacer disposed between the first substrate and the second substrate wherein the force sensor member and the electrode part are spaced apart from each other by the spacer.

3. The electronic device according to claim 1, wherein at least one of the first electrode or the second electrode comprises a curved element.

4. The electronic device according to claim 1,
wherein the first electrode includes a first line pattern disposed along one side of the first substrate, and a plurality of first branch patterns projecting from the first line pattern, and
wherein the second electrode includes a second line pattern disposed along the other side of the first substrate, and a plurality of second branch patterns projecting from the second line pattern.

5. The electronic device according to claim 4, wherein each of the plurality of first branch patterns and each of the plurality of second branch patterns are disposed on the same plane, and each of the plurality of first branch patterns alternates with each of the plurality of second branch patterns.

6. The electronic device according to claim 1, wherein the housing includes a bottom base and a sidewall defining the receiving space, the cover window supports the display module, and the force sensing panel is disposed between the bottom base of the housing and the display module.

7. The electronic device according to claim 1, wherein the display module includes:
a display panel connected to the force sensing panel; and
a position sensing panel disposed between the cover window and the display panel.

8. The electronic device according to claim 1, further comprising:
a rotation axle vertically penetrating the bottom base of the housing, the force sensing panel, the display module and the cover window;
a hand which is arranged to rotate on the cover window in accordance with a rotation of the rotation axle;
an axle driver to rotate the rotation axle, the axle driver being disposed on a rear surface of the housing;
a rear cover covering the rear surface of the housing; and
a front transparent cover connected with a front surface of the housing and covering the hand.

9. The electronic device according to claim 1, wherein the force sensing panel has a ring shape and the force sensing panel is at a periphery of the display module.

10. The electronic device according to claim 9, wherein the housing includes a bottom base and a sidewall defining the receiving space, the cover window supports the display module, and the force sensing panel is disposed between the sidewall of the housing and an edge of the cover window, the force sensing panel surrounding the display module.

11. The electronic device according to claim 10,
wherein the first electrode includes N first electrode pattern groups disposed on the first substrate and symmetrically provided with respect to a central line of the first substrate, and a first line pattern connecting the N first electrode pattern groups,
wherein the second electrode includes N second electrode pattern groups that are parallel to the N first electrode pattern groups on the first substrate, and a second line pattern connecting the N second electrode pattern groups, and
wherein N is an integer greater than or equal to 2.

12. The electronic device according to claim 11, further comprising:
a first substrate upon which the electrode part is disposed;
a second substrate upon which the force sensor member is disposed, wherein the second substrate is disposed on the first substrate; and
a spacer disposed between the first substrate and the second substrate wherein the force sensor member and the electrode part are spaced apart from each other by the spacer,
wherein the spacer includes N adhesive patterns disposed between each of the N first electrode pattern groups, and
the force sensor member has a pattern that overlaps each of the N first electrode pattern groups and the N second electrode pattern groups.

13. The electronic device according to claim 11, wherein the spacer includes:

N insulator patterns disposed between each of the N first electrode pattern groups; and
N adhesive patterns overlapping the N insulator patterns, wherein the force sensor member has a pattern overlapping each of the N first electrode pattern groups and the N second electrode pattern groups.

14. The electronic device according to claim 11,
wherein each of the N first electrode pattern groups includes a plurality of first branch patterns projecting from the first line pattern, wherein the plurality of first branch patterns are spaced apart from each other, and
wherein each of the N second electrode pattern groups includes a plurality of second branch patterns projecting from the second line pattern, wherein the plurality of second branch patterns are spaced apart from each other.

15. The electronic device according to claim 14, wherein each of the plurality of first branch patterns and each of the plurality of second branch patterns are on the same plane, and each of the plurality of first branch patterns alternates with each of the plurality of second branch patterns.

16. The electronic device according to claim 9, further comprising:
a rotation axle vertically penetrating the bottom base of the housing, the display module and the cover window;
a hand which is arranged to rotate on the cover window in accordance with a rotation of the rotation axle;
an axle driver to rotate the rotation axle, the axle driver being disposed on a rear surface of the housing;
a rear cover covering the rear surface of the housing; and
a front transparent cover connected to a front surface of the housing, the front transparent cover covering the hand.

17. An electronic device comprising:
a housing;
a display module;
a cover window over the display module; and
a force sensing panel supported by the housing, the force sensing panel including:
a first electrode;
a second electrode disposed in a same plane with the first electrode; and
a force sensor member overlapping with and separated from the first electrode and the second electrode by a gap, the force sensor member changing shape to electrically connect the first electrode to the second electrode when touch pressure is applied to the cover window,
wherein the force sensor member is not in contact with the first electrode and the second electrode while no touch pressure is applied to the cover window, and the force sensor member is in contact with the first electrode and the second electrode in response to the touch pressure to the cover window, the force sensor member creating a resistance between the first electrode and the second electrode when the force sensor member is in contact with the first electrode and the second electrode, wherein the resistance is based on a contact area between the force sensor member and the first electrode and the second electrode.

18. The electronic device according to claim 17,
wherein the first electrode includes a first line pattern disposed along one side of the first substrate, and a plurality of first branch patterns projecting from the first line pattern toward the second electrode, and
wherein the second electrode includes a second line pattern disposed along the other side of the first substrate, and a plurality of second branch patterns projecting from the second line pattern toward the first electrode.

19. The electronic device according to claim 17, wherein the housing includes a bottom and the force sensing panel is disposed between the bottom of the housing and the display module.

20. The electronic device according to claim 17, wherein the force sensing panel has a ring shape and the force sensing panel is at a periphery of and surrounds the display module.

21. An electronic device comprising:
a housing having a receiving space;
a display module in the receiving space of the housing;
a cover window covering the receiving space; and
a force sensing panel between the housing and the display module, configured to sense a touch force corresponding to a touch pressure applied to the cover window, the force sensing panel having first and second electrodes being in a same plane and spaced apart from each other on a first substrate and a force sensor member on a second substrate,
wherein the first and second electrodes and the force sensor member are provided at a predetermined air gap from each other by a spacer such that the force sensor member is not in contact with the first electrode and the second electrode while no touch pressure is applied to the cover window and the air gap increases a space for change of shape in the force sensor member, thereby improving force sensing efficiency of the electronic device when compared to a conventional electronic device that lacks the air gap, and
wherein the force sensor member is in contact with the first electrode and the second electrode in response to the touch pressure to the cover window, the force sensor member creating a resistance between the first electrode and the second electrode when the force sensor member is in contact with the first electrode and the second electrode.

22. The electronic device according to claim 21, wherein the force sensing panel includes a resistive type force sensor which is changed in accordance with a change of distance between the display module and the housing.

23. The electronic device according to claim 21, wherein the first electrode and the second electrode are on the same plane of the first substrate and parallel with each other.

24. The electronic device according to claim 21, wherein the first electrode includes a first line pattern and a plurality of first branch patterns and the second electrode includes a second line pattern and a plurality of second branch patterns, wherein each of the plurality of first branch patterns alternates with each of the plurality of second branch patterns.

25. The electronic device according to claim 21, wherein the force sensor member is made of a piezo-resistive based material or a pressure-sensitive adhesive material.

26. The electronic device according to claim 21, further comprising a rotation axle, a wing, an axle driver and a front transparent cover, and the rotation axle, the wing and the axle driver constitute a clock device in the electronic device.

27. The electronic device according to claim 21, wherein the force sensing panel has a ring shape with a central hole and surrounds the display module.

28. The electronic device of claim 1, wherein the electronic device is a watch.

29. The electronic device of claim 1, wherein the force sensing member spans across an entire surface of the force sensing panel.

30. The electronic device of claim 1, further comprising:
a substrate; and
wherein the force sensor member is farther from the substrate than both the first electrode and the second electrode.

* * * * *